United States Patent [19]

Sacher et al.

[11] Patent Number: 4,557,946
[45] Date of Patent: Dec. 10, 1985

[54] MOISTURE IMPERMEABILITY OR ORGANOSILICONE FILMS

[76] Inventors: Edward Sacher, 5796 Melling Ave., Cote St. Luc, Quebec, Canada, H4W 2C7; Michael R. Wertheimer, 910 Somerville Ave., Westmount, Quebec, Canada, H3Z 1J4; Henry P. Schreiber, 411 Fortier St., St. Hilaire, Quebec, Canada, J3H 2X6

[21] Appl. No.: 500,810

[22] Filed: Jun. 3, 1983

[51] Int. Cl.$^4$ ............................................. B05D 3/06
[52] U.S. Cl. ........................................ 427/41; 427/44; 427/314
[58] Field of Search ......................... 427/41, 44, 314

[56] References Cited

U.S. PATENT DOCUMENTS

| | | | |
|---|---|---|---|
| 3,518,108 | 6/1970 | Heiss et al. | 427/41 |
| 3,822,298 | 7/1974 | Smolinsky et al. | 427/41 |
| 4,137,365 | 1/1979 | Fletcher et al. | 427/41 |
| 4,242,188 | 12/1980 | Ninomi et al. | 427/41 |
| 4,260,647 | 4/1981 | Wang et al. | 427/41 |

FOREIGN PATENT DOCUMENTS 538669  7/1976  Japan .................................... 427/41

Primary Examiner—Sam Silverberg
Assistant Examiner—Janyce A. Bell
Attorney, Agent, or Firm—Watson, Cole, Grindle & Watson

[57] ABSTRACT

The invention comprises a method of controlling the water permeability of a coating applied to a substrate, in particular for the case of organosilicone coatings.

7 Claims, 7 Drawing Figures

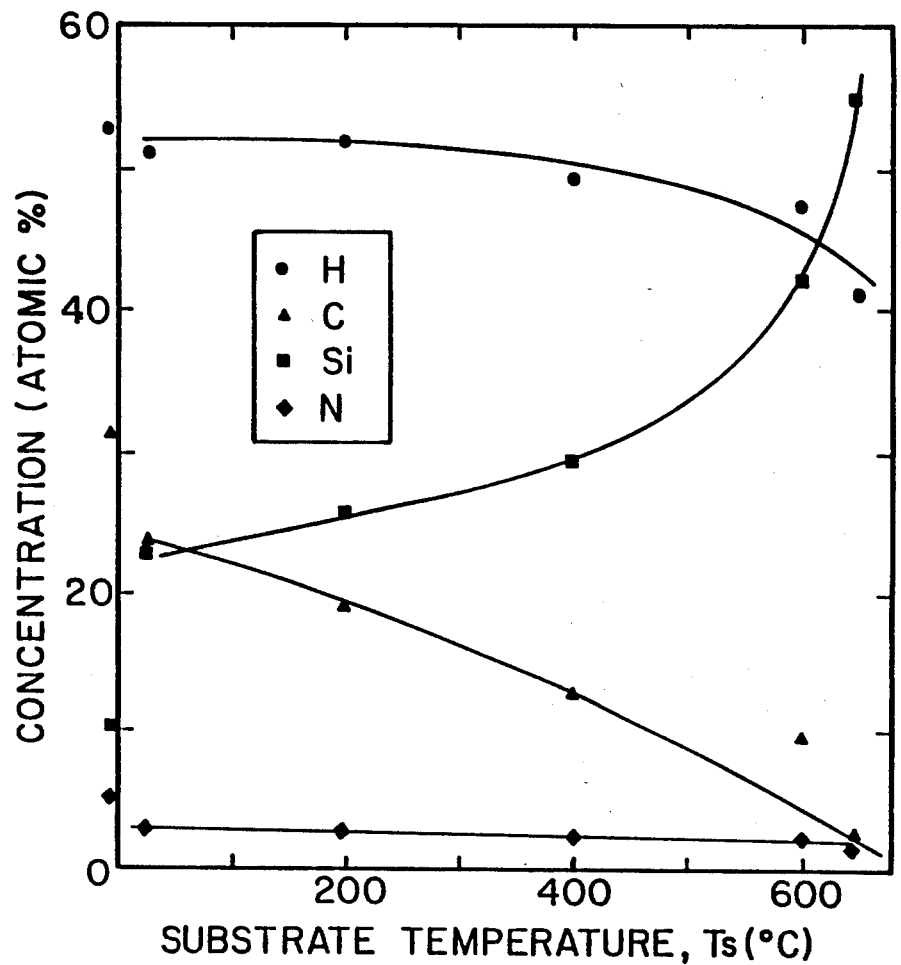
FIG.1
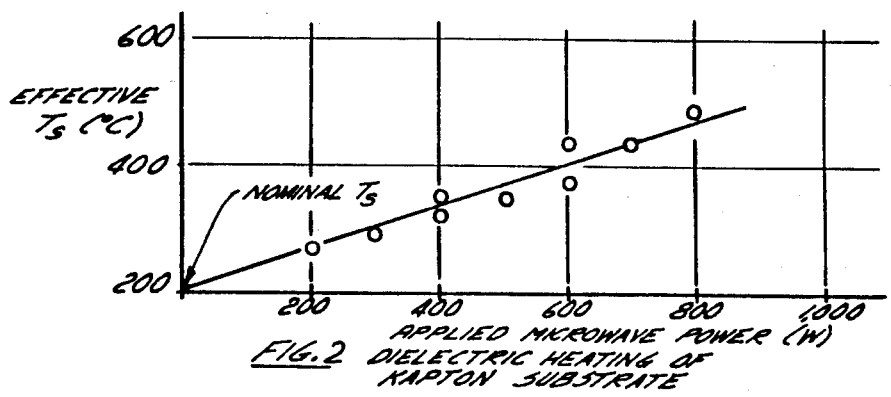
FIG.2 DIELECTRIC HEATING OF KAPTON SUBSTRATE

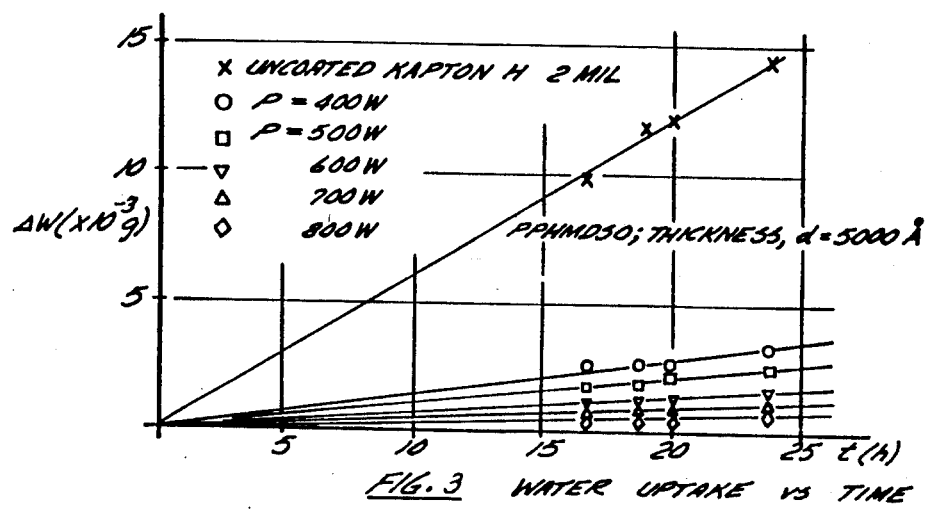
FIG. 3 WATER UPTAKE vs TIME
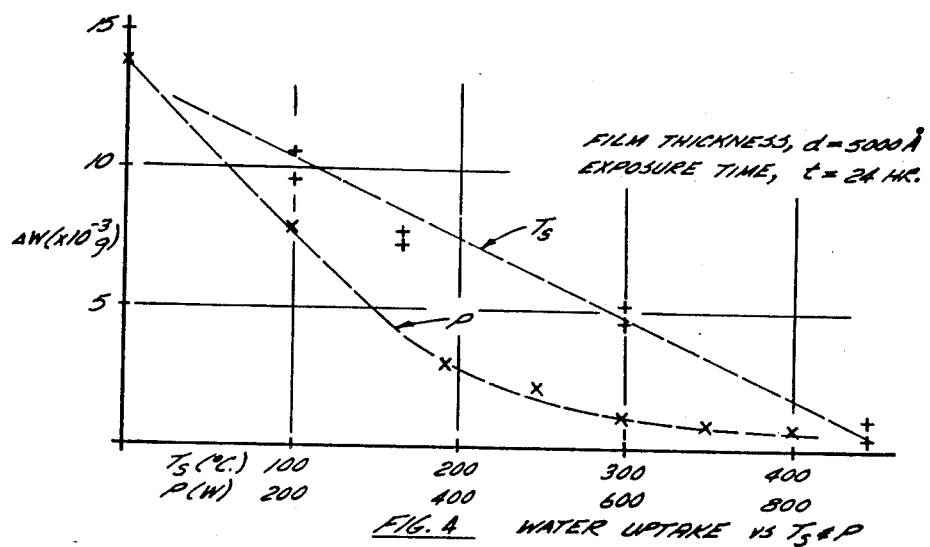
FIG. 4 WATER UPTAKE vs $T_s$ & $P$
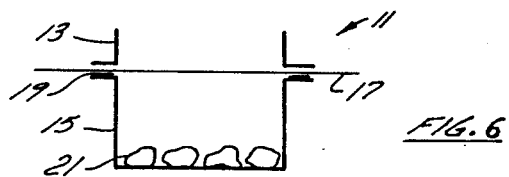
FIG. 6

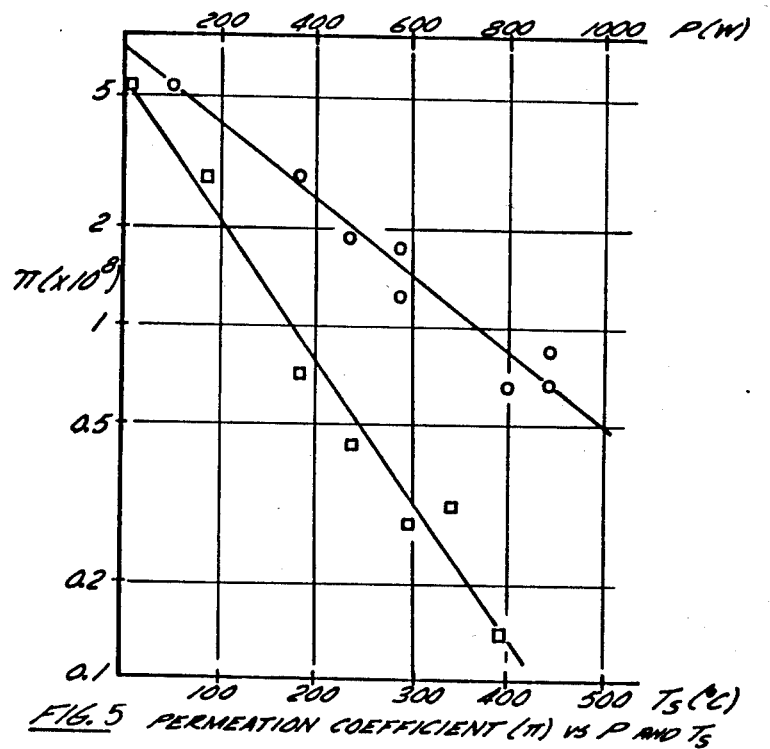
FIG. 5 PERMEATION COEFFICIENT (π) vs P AND $T_S$
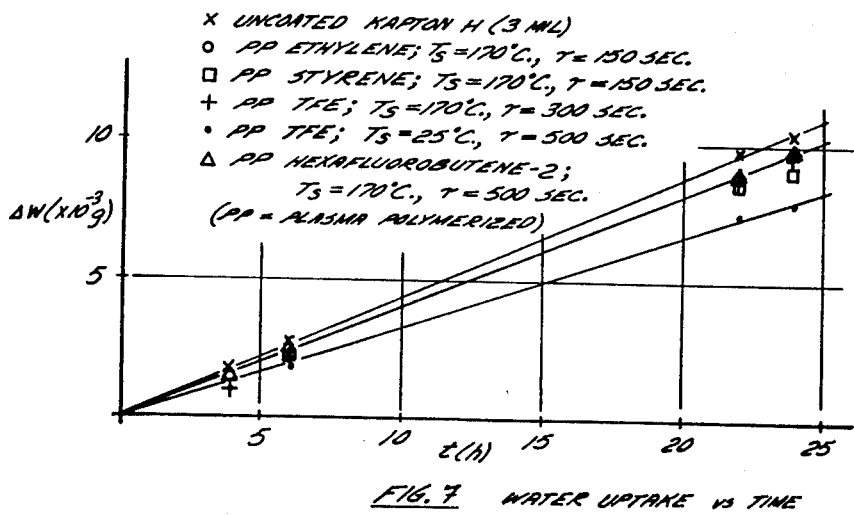
FIG. 7 WATER UPTAKE vs TIME

MOISTURE IMPERMEABILITY OR ORGANOSILICONE FILMS

BACKGROUND OF THE INVENTION

1. Field of the Invention

The invention relates to a method of controlling the water permeability of a coating, and more particularly it relates to a method of controlling the water permeability of an organosilicone coating applied to a substrate.

2. The Prior Art

The use of moisture-permeation barriers is well known in the art, and indeed such barriers are in every day use. Typically, they are employed for corrosion protection, passivation of electronic circuits, etc. Thus, for instance, in dielectrics utilized in hostile environmental applications, the electrical conductivity of such dielectrics is substantially affected by the presence of humidity through its mobilization of otherwise immobile ions and it is often desirable and/or necessary to provide a barrier which will reduce moisture permeation, enhancing the performance and the lifetime of the device. There are many known water-permeation barriers, such as polymers, and they have received extensive use. However, they do also suffer from some inadequacies, such as poor adhesion, shrinkage, water sensitivity, and too high water permeation for certain uses. Other methods for barring entry of moisture include hermetically sealing or fusing metal-metal, metal-glass or metal-ceramic, etc.; however, not only are such methods costly and extremely time-consuming, they increase the size of the device, thus compromising commercial advantages of a product.

It is an object of the present invention to provide a method of controlling the water permeability to a substrate such that, in many instances, a lower permeability of a topcoat film covering a substrate will limit the amount of water reaching the substrate.

SUMMARY OF THE INVENTION

It has been found that organosilicone polymers, when applied under certain process parameters in the form of thin plasma polymerized coatings, can be controlled to provide a certain physical structure which can substantially decrease water permeation into the plasma polymer/substrate composite, while at the same time adhering well to the substrate. These coatings are relatively inexpensive to apply in a controlled, reproducible manner and can be applied to industrial processes, thereby overcoming many of the disadvantages previously associated with moisture barriers.

As used in this specification, the term "substrate" denotes any suitable solid, polymeric or non-polymeric, natural or synthetic , into which it is desired to reduce moisture permeation. As explained hereinafter, the types of substrates may vary very widely and in the following description, reference is made to one type of substrate as being only illustrative of the type of substrates that may be used, and as only being illustrative of the type of problems which can be alleviated by the present invention.

In carrying out the invention, any suitable organosilicone monomer having a sufficiently high vapour pressure may be employed in the process. Suitable monomers are basically those which have a vapour pressure in excess of 0.01 of a Torr. In a preferred embodiment of the invention, the organosilicone coating applied on the substrate is plasma polymerized hexamethyldisiloxane.

In carrying out the process of the present invention, the polymers are deposited using a plasma generator. Such plasma generators are well known in the art, and reference may be made to the literature for this purpose. With reference to the type of plasma, a low pressure plasma (or "glow discharge") is preferred. Although the use of RF or microwave frequencies is preferred in the present process; in principle, frequencies ranging from 0-100 GHz can be used.

In greater detail, it has been found that, by controlling two of the process parameters during plasma deposition within desired limits, i.e., the power level and the substrate temperature, the composition of the film between its "organic" and "inorganic" components can be varied to give desired permeation properties. An example is seen in FIG. 1. In accordance with the present invention, power levels between 0.01 watts/cu. cm$^3$. to about 10 watts/cu. cm$^3$. can be utilized, while a true substrate temperature of between 25° C. and 1000° C. may be employed. As will be shown in detail hereinbelow, one is able to obtain varied permeation characteristics within these parameters.

If it is desired to have a low coefficient of water permeation ($10^{-9}$ std cm$^3$. cm/cm$^2$. sec. cm Hg, or better, at 20° C.), it is desirable to increase the "inorganic" or silicon content along with crosslinking of the polymers, compared to known plasma polymerized silicone polymers, by increasing the power density and/or the substrate temperature during the deposition procedure. As the "inorganic" content increases, these substantially continuous, pin-hole free coatings have high degrees of moisture impermeability and crosslinking within the polymer, with the coating adhering very strongly to the substrate surface.

Surprisingly, it is not necessary to increase the coating thickness to any great extent to lead to a low coefficient of water permeation. Indeed, it has been found that deposits of the plasma polymerized coatings exceeding about 5000 Å in thickness did not lead to a substantial further reduction in the moisture permeation rate and for this reason, it is seldom necessary to deposit a coating thicker than 5000 Å, unless necessary for some other purpose.

Having thus generally described the invention, reference will now be made to the accompanying drawings, in which:

FIG. 1 is a graph showing the overall composition of plasma polymerized organosilicone films, prepared from hexamethyldisilazane, as a function of substrate temperature during deposition, $T_s$.

FIG. 2 is a graph showing the rise in effective $T_s$ corresponding to the microwave power applied;

FIG. 3 is a graph showing the effect of increased power density on the moisture permeation rate;

FIG. 4 is a graph showing the moisture permeation rate corresponding to $T_s$ and P;

FIG. 5 is a graph showing the permeation coefficient vs. P and $T_s$;

FIG. 6 shows a test carried out for measuring the moisture permeation rate; and

FIG. 7 is a comparative graph showing performance of other plasma polymers as moisture barriers.

It has been found that the moisture permeation rate for a 5000 Å thick deposit decreased monotonically as the substrate temperature ($T_s$) increased. A ten-fold reduction in the moisture permeation rate was obtained with the substrate temperature ($T_s$) being $\geq 400°$ C.

FIG. 1 shows the effect of substrate temperature $T_s$, on the composition of plasma polymerized organosilicone films, made from hexamethyldisilazane in this instance. Whereas the "organic" (carbon) content is seen to decrease systematically with increasing $T_s$, the silicon content is seen to rise. One can thus state that the films become increasingly "inorganic" in nature as $T_s$ is raised.

It was an object, in connection with this invention, to obtain a substantial decrease in the water-permeation rate, at the lowest possible value of $T_s$. Accordingly, a further factor was examined—that of the power density in the plasma. Thus, the applied microwave power (P) was increased from a constant 200 W (corresponding to $P \sim 0.4$ W/cm$^3$) to 1000 W ($P \sim 2$ W/cm$^3$), and this increase gave rise to two separate effects, both influencing the structure of the thin film deposits. The first of these was that an increase in the power density, and hence in the average electron temperature in the plasma, resulted in increased fragmentation of the monomer molecules and thus in more "inorganic" and denser films.

The corresponding increase in the electric field intensity gave rise to greater power dissipation in the dielectric substrate (due to dielectric heating), and hence to a rise in the effective $T_s$. This latter effect was studied further in the following manner: small pieces of commercially available solids of known melting temperature were inserted between the stainless steel heating substrate and a "Kapton" film to be coated. The substrate was raised to a nominal $T_s$ of 200° C., and plasma was applied at varying power levels for a constant duration of 30 seconds. The maximum $T_s$ during experimentation was subsequently determined by observing which samples had melted. On this basis, the calibration curve shown in FIG. 2 was established, which shows an essentially linear rise in the effective $T_s$ to about 500° C. for an applied power of 900 W.

FIG. 3 shows the effect of increasing the power density and in FIG. 4, the moisture uptake after 24 hours is plotted as a function of $T_s$ (for P=200 W) and of P (for a nominal $T_s$ of 200° C.). Thus, it can be seen that increasing the power density in the plasma is more effective than substrate heating in reducing moisture permeation through the barriers.

A series of "Kapton" samples coated according to the present invention were tested for moisture permeation using a Dohrman Permeation Analyser Model PPA-1, which was extensively modified. FIG. 5 is a semilogarithmic plot of log $\pi$ ($\pi$ is the permeation coefficient in std. cm$^3$. cm/cm$^2$. sec. cm Hg) as a function of $T_s$ (for P=200 W) and of P (nominal $T_s$=200° C.). As in FIG. 4, P is seen to be the parameter which more effectively reduces $\pi$: for P=800 W, $\pi$ is reduced about 50-fold compared with the bare "Kapton" foil. Referring to FIG. 2, the "true" $T_s$ under this condition is 480° C.; the effectiveness of increased power density, therefore, is only partially related to an increase in $T_s$.

Referring to FIG. 5, from the lower curve, it is seen that a ten-fold reduction in $\pi$ is attained when $P \approx 400$ W; from FIG. 2, the corresponding $T_s$ is $\sim 325°$ C. On this basis, a 5000 Å film produced at nominal $T_s$=200° C. and $P \approx 400$ W, attained a reduction in moisture permeation by a factor of 10.

Table 1 hereunder, compares permeation data for various polymers. The table shows permeation coefficients ($\pi$), diffusion coefficients (D, in cm$^2$/sec.), solubility coefficients (S in std cm$^3$ /cm$^3$. cm Hg), and water vapor concentrations in the sample (C, in g H$_2$O/g polymer) for the materials indicated.

TABLE 1

| | Typical Permeation Parameters for Water Near Room Temperature | | | |
|---|---|---|---|---|
| Material Type | $\pi$ | D | S | C |
| Epoxy | $\sim 10^{-7}$ | $\sim 10^{-7}$ | $\sim 1$ | $\sim 0.01$ |
| Polyimide | $\sim 10^{-8}$ | $\sim 10^{-9}$ | $\sim 10$ | $\sim 0.02$ |
| Fluorocarbon | $\sim 10^{-9}$ | $\sim 10^{-8}$ | $\sim 0.1$ | $\sim 0.0001$ |
| Polyimide/plasma-polymerized hexamethyldisiloxane | $\sim 10^{-9}$ | $\sim 10^{-9}$ | $\sim 1$ | $\sim 0.001$ |

Moisture permeation rates were additionally measured using ASTM E 96-53T, "Water Vapor Transmission of Materials in Sheet Form" in the following manner. Referring to FIG. 6, a "Kapton" film (either bare, or plasma-coated on one side) was placed over a small glass dish as shown in the drawings. ASTM test procedure "E" (T=37.8° C., R.H.—0% inside dish, R.H.—90% outside dish) was used for durations up to 24 hours, and the moisture permeation (weight gained by the hygroscopic CaCl$_2$ inside the dish) was measured using an electronic micro-balance (Sartorius, Model 2600). Straightforward additivity relationships, well known in the field of permeation, were used to separate the $\pi$ contribution of the plasma polymer layer, which was found to vary from $2.3 \times 10^{-10}$ at 500 Å to $3.1 \times 10^{-10}$ at 5000 Å.

FIG. 7 shows water permeation rates attained with other plasma polymers, and as will be noted, the results are clearly not up to the standards attained with plasma polymerized organosilicone coatings according to the present invention.

In addition to the moisture permeability, as mentioned at the outset, the adhesion of the coatings to the substrates is also of particular interest. The adhesion of the coatings was tested by the simple "Scotch tape" peel test. Thus, a small piece of "Scotch" brand adhesive tape was pressed to the surface, then peeled off. If the polymer film did not lift off the substrate, the adhesion was deemed satisfactory. This peel test was carried out in connection with various substrates, including "Kapton H". It was found that films deposited at $T_s \approx 25°$ C. usually adhere rather poorly, but that beyond a certain elevated $T_s$ value, adhesion is excellent. Table 2 below shows the substrate temperatures for 5000 Å thick films. It is to be noted that all films adhere well to "Kapton" for $T_s \gtrsim 180°$ C.

TABLE 2

| $T_s$ values for Adhesion of 5000 Å Plasma-polymer films on various substrate materials | | |
|---|---|---|
| Monomer | Substrate | $T_s$ (°C.) |
| Hexamethyl-disiloxane | Glass | 170–200 |
| | Stainless Steel | 200 |
| | Kapton | 150 |
| Hexamethyl-disalazane | Glass | 170–200 |
| | Stainless Steel | 200 |
| | Kapton | 150 |
| Silane | Glass | 180–200 |
| | Kapton | 180 |
| Ethylene | Glass | 200 |
| | Kapton | 150–170 |
| Styrene | Glass | 170–200 |
| | Kapton | 170 |
| Tetrafluoro-ethylene | Glass | 150 |
| | Kapton | 25 |

TABLE 2-continued $T_s$ values for Adhesion of 5000 Å Plasma-polymer films on various substrate materials

| Monomer | Substrate | $T_s$ (°C.) |
| --- | --- | --- |
| Hexafluoro-butene-2 | Glass | 150 |
| | Kapton | 25 |

Thus, it will be seen from this invention that truly improved moisture barriers can be produced according to the instant process. Thus, for instance, a 5000 Å thick plasma polymerized hexamethyldisiloxane coating produced in a microwave plasma with a power density of ~0.8 W/cm$^3$ and a nominal substrate temperature of 200° C., reduces the moisture permeation of a "Kapton" film by ten-fold. As will be seen from the above, the moisture permeation can be varied according to the parameters of the process. Indeed, one is able to achieve an extremely large reduction in the moisture permeation compared to known products, at certain optimum settings.

We claim:

1. A method of forming a protective film having a controlled moisture permeability on a substrate, said protective film comprising a plasma polymerized organosilicone material having an inorganic component, the proportion of said inorganic component in said film determining its moisture permeability, said method comprising:

(a) providing a substrate to be protected;
   (b) heating said substrate to a temperature of between 25° and 1000° C.;
   (c) plasma polymerizing an organosilicone film on said substrate; and
   (d) controlling the power level of the plasma in step (c) to between 0.1 and 10 watts per cubic centimeter, the power level and the substrate temperature determining the proportion of inorganic component in said film.

2. The method of claim 1, wherein said substrate is heated to a temperature of between 400° C. and 1000° C. and plasma polymerizing the organosilicone film in a glow discharge.

3. The method of claim 1, wherein said plasma polymerized film is hexamethyldisiloxane.

4. The method of claim 3, wherein said film is formed to have a thickness of less than 5000 Å.

5. The method of claim 1, wherein said organosilicone film is plasma polymerized in a microwave discharge.

6. The method of claim 1, wherein the step of plasma polymerizing the organosilicone film comprises the step of plasmapolymerizing the film utilizing an organisilicone monomer having a vapour pressure in excess of 0.01 of a Torr at a substrate temperature of between 400° C. and 1000° C. to have a thickness of less than 5000 Å.

7. The method of claim 6, wherein the organosilicone film is hexamethyldisiloxane and is plasma polymerized in a glow discharge.

* * * * *